US006343711B1

(12) United States Patent
Coughlin

(10) Patent No.: US 6,343,711 B1
(45) Date of Patent: Feb. 5, 2002

(54) MEDICAMENT DISPENSING CELL

(75) Inventor: Shane P. Coughlin, Kansas City, MO (US)

(73) Assignee: Scriptpro, LLC, Mission, KS (US)

(*) Notice: Subject to any disclaimer, the term of this patent is extended or adjusted under 35 U.S.C. 154(b) by 51 days.

(21) Appl. No.: 09/587,638

(22) Filed: Jun. 5, 2000

(51) Int. Cl.[7] .................................................. A01C 9/00

(52) U.S. Cl. ....................................... 221/217; 221/277

(58) Field of Search .............................. 221/2, 7, 8, 13, 221/241, 210, 217, 303, 277, 253, 259, 237

(56) References Cited

U.S. PATENT DOCUMENTS

| | | | | |
|---|---|---|---|---|
| 1,128,561 | A | * | 2/1915 | Webendorfer |
| 2,690,856 | A | * | 10/1954 | Trondle |
| 3,746,211 | A | * | 7/1973 | Burgess, Jr. |
| 3,921,196 | A | * | 11/1975 | Patterson |
| 4,284,301 | A | * | 8/1981 | Geiger et al. |
| 4,476,381 | A | * | 10/1984 | Rubin |
| 4,660,824 | A | * | 4/1987 | Hermkens et al. |
| 4,753,473 | A | * | 6/1988 | Arnett |
| 4,810,230 | A | * | 3/1989 | Shirasawa |
| 4,835,372 | A | * | 5/1989 | Gombrich et al. |
| 4,857,716 | A | * | 8/1989 | Gombrich |
| 4,872,803 | A | * | 10/1989 | Asakawa |
| 4,902,263 | A | * | 2/1990 | Ito et al. |
| 4,918,604 | A | * | 4/1990 | Baum |
| 4,958,280 | A | * | 9/1990 | Pauly et al. |
| 5,033,785 | A | * | 7/1991 | Woolley, Jr. |
| 5,082,268 | A | * | 1/1992 | Santoro |
| 5,208,762 | A | * | 5/1993 | Charhut et al. |
| 5,332,275 | A | * | 7/1994 | Conway et al. |
| 5,337,919 | A | * | 8/1994 | Spaulding et al. |
| 5,401,059 | A | * | 3/1995 | Ferrario |
| 5,713,487 | A | * | 2/1998 | Coughlin |
| 5,762,235 | A | * | 6/1998 | Coughlin |
| 5,798,020 | A | * | 8/1998 | Coughlin et al. |
| 5,860,563 | A | * | 1/1999 | Guerra et al. |
| 5,873,488 | A | * | 2/1999 | Guerra |
| 5,883,370 | A | * | 3/1999 | Walker et al. |
| 5,897,024 | A | * | 4/1999 | Coughlin et al. |

FOREIGN PATENT DOCUMENTS

| | | |
|---|---|---|
| JP | 53145260 | * 12/1978 |
| JP | 5943743 A | * 10/1994 |
| SD | SU918086 | * 4/1982 |

* cited by examiner

*Primary Examiner*—Kenneth W. Noland
(74) *Attorney, Agent, or Firm*—Hovey, Williams, Timmons & Collins

(57) ABSTRACT

A medicament dispensing cell (12) is provided which is used in large, automated dispensing machines (10) to provide rapid and accurate dispensing of medicament dosage forms such as tablets (124), capsules, or pills. The cell (12) includes a housing (20) for storage of tablets (124) and includes a rotatable platen conveyor assembly (68) which moves the tablets (124) along a passageway (96) and through an outlet opening (36). The passageway (96) includes a restricted throat section (98) defined by a bushing (78) and an inclined roller (100). The roller (100) is oriented so as to prevent simultaneous passage of two tablets (124) through the throat section (98).

11 Claims, 5 Drawing Sheets

MEDICAMENT DISPENSING CELL

BACKGROUND OF THE INVENTION

1. Field of the Invention

The present invention is broadly concerned with dispensing cells useful in automated dispensing equipment and especially medicament dispensing devices. More particularly, the invention is concerned with such dispensing cells which are improved by provision of an adjustable, restricted throat forming a part of the pathway between the storage section and outlet opening of the housing; the throat section is defined by a pair of adjacent components, one of such components being an obliquely oriented roller sized and located to assist in the passage of medicaments or the like through the throat while preventing simultaneous passage of multiple medicaments through the throat.

2. Description of the Prior Art

U.S. Pat. No. 5,337,919 describes an automatic dispensing machine having a plurality of dispensing cells for storing and dispensing of various types of solid medicament dosage forms. Each cell includes a rotatable platen serving to move the dosage forms through and out of the cell. A manipulator arm forming a part of the dispensing machine retrieves an empty vial and positions the vial adjacent the outlet of a selected cell. The manipulator arm includes a drive gear which engages the platen gear in order to rotate the platen and thereby initiate dispensing of medicaments. The filled vial is then positioned on a discharge conveyor for subsequent handling such as labeling and inspection.

In addition, U.S. Pat. No. 5,895,024 describes an improved dispensing cell used in such automated equipment. The cells of the '024 patent are a significant advance in the art and have achieved considerable commercial success. However, in certain instances, these cells have experienced problems. For example, medicaments sometimes become lodged between the storage sections and the outlet sections of these cells, requiring an operator to either manually remove the lodged medicaments or to reverse the rotation of the platen in an attempt to clear the obstruction. Another problem is that stacked pairs of medicaments may be simultaneously passed through and out of the cell. This can disrupt the count or lead to breakage of the medicaments.

There is accordingly a need in the art for an improved dispensing cell, which more effectively transfers medicaments out of the cell without medicaments becoming lodged or clogged and that substantially eliminates the problem of simultaneous passage of stacked medicaments through the cell.

SUMMARY OF THE INVENTION

The present invention overcomes the problems outlined above and provides a dispensing cell for dispensing medicaments (e.g., tablets, capsules, caplets, or pills) or other discrete bodies. The cell includes a housing having a storage section that holds the medicaments, a dispensing outlet, and a passageway between the storage sections and the outlet. Moreover, the cell includes a conveyor assembly that conveys the medicaments from the storage section through the passageway and out the outlet; the conveyor assembly is preferably in the form of a ribbed, rotatable platen. The passageway has a restricted throat section between the storage section of the housing and the housing outlet. This throat section is defined by a pair of spaced apart components, one of which is an inclined roller presenting an upper margin and a lower margin. The roller is oriented so that the upper margin is closer to the other component than the lower margin thereof, thereby preventing simultaneous passage of two of the medicaments through the throat section.

In preferred forms, the other components forming the restricted throat section is a rotatable bushing having a resilient outer surface. The bushing is preferably coaxial with the axis of rotation of the platen. Downstream of the throat section a pair of resilient fingers are provided which urge the medicaments against a guide wall, so that the medicaments are properly aligned and separated for single file passage out of the housing outlet.

DETAILED DESCRIPTION OF THE PREFERRED EMBODIMENT

Figure 1:
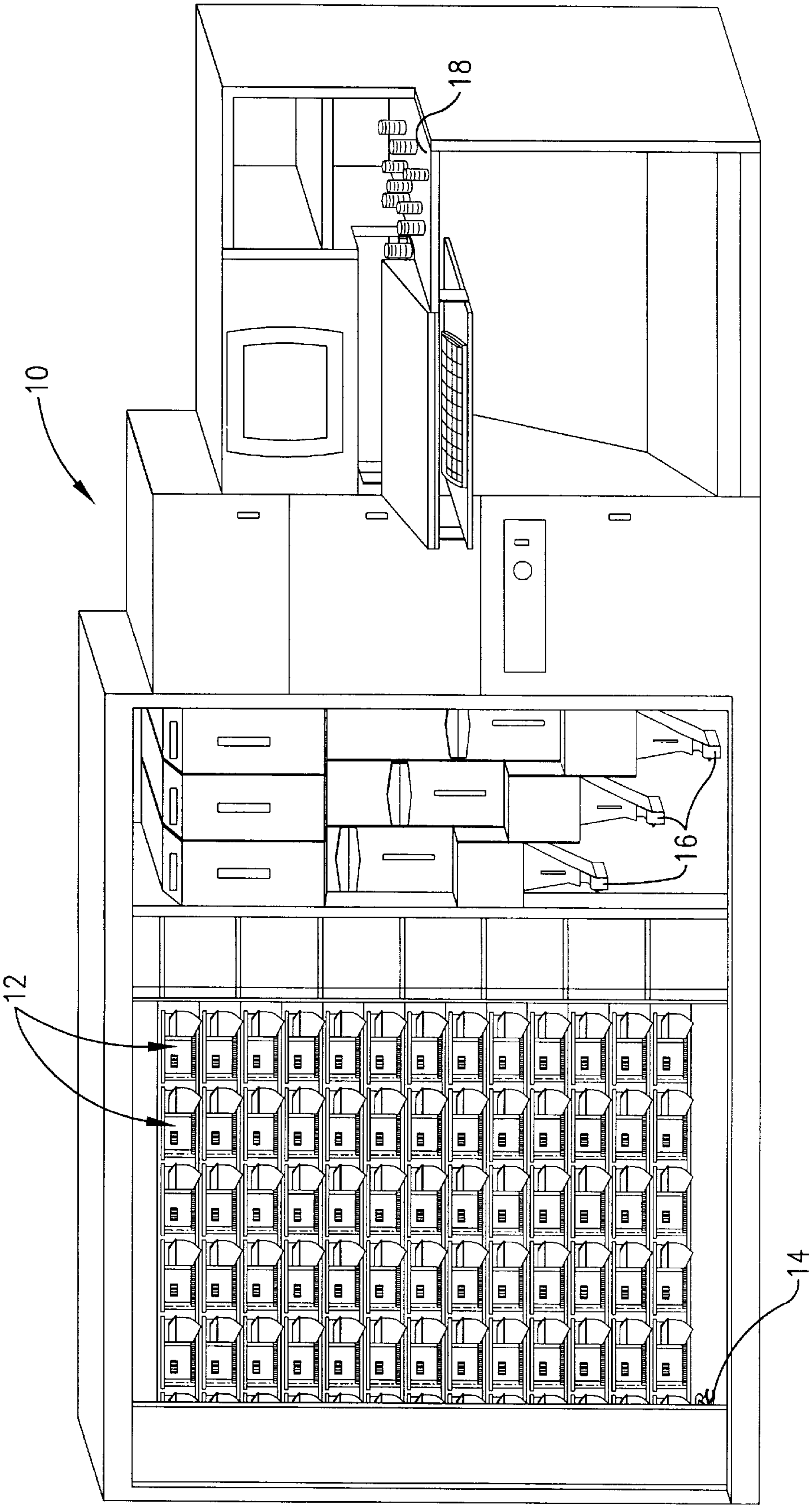
FIG. 1 is an elevational view of an automatic medicament dispensing machine including a plurality of individual dispensing cells.

Turning now to the drawings, FIG. 1 illustrates an automatic dispensing machine 10 designed for the rapid, automatic dispensing of various medicaments into individual vials. The machine 10 is very similar to the machine disclosed in U.S. Pat. No. 5,337,919 incorporated by reference herein. Briefly, the machine 10 includes a plurality of stacked, individual dispensing cells 12, and a manipulating mechanism 14 that retrieves an empty vial from one of the vial dispensers 16, places the empty vial adjacent a selected dispensing cell 10 for receipt of medicaments therefrom, and then places the filled vial on a conveyor for labeling and subsequent inspection at inspection station 18.

Each of the cells 12 is identical and is similar in many respects to the cell described in U.S. Pat. No. 5,897,024, also incorporated by reference herein. Broadly speaking, each cell 12 includes an oblong housing 20, a platen conveyor assembly 22, and an outlet assembly 24.

Figure 2:
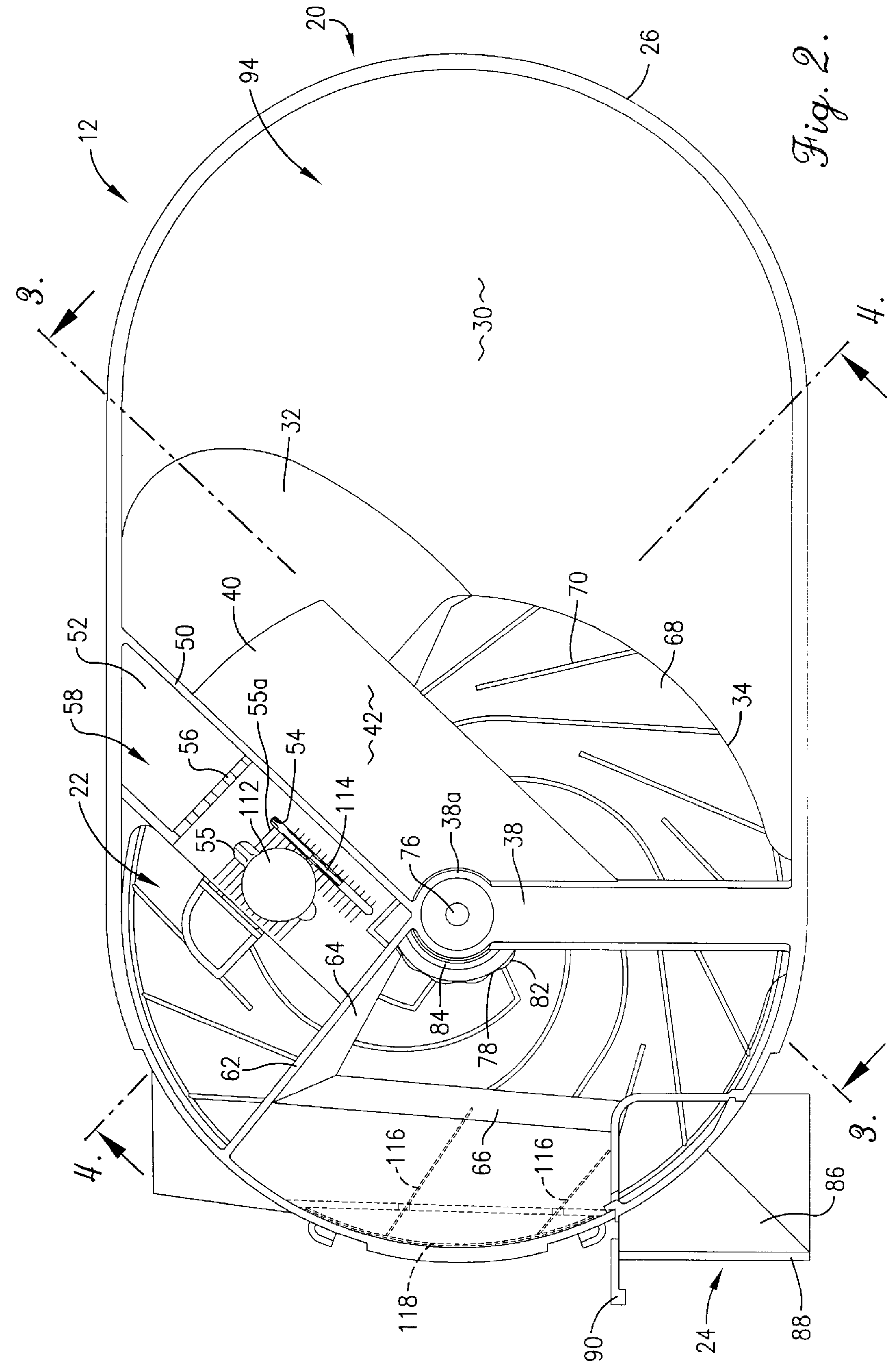
FIG. 2 is a top view of a dispensing cell in accordance with the invention, with the cover removed.
Figure 3:
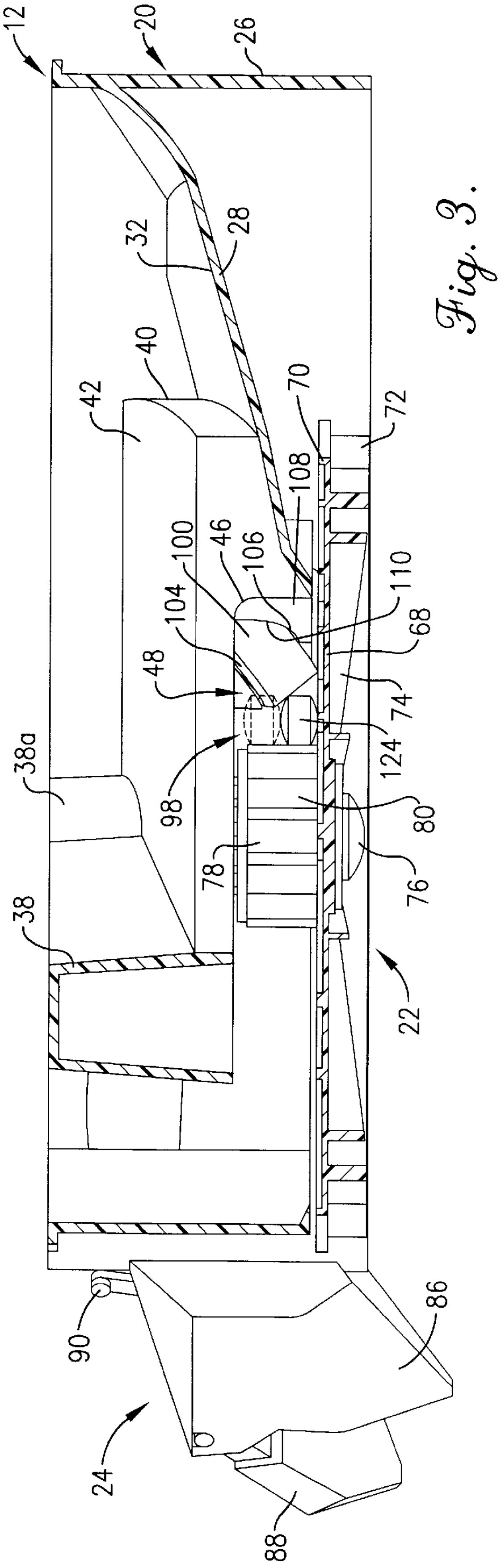
FIG. 3 is a vertical sectional view taken along line 3—3 of FIG. 2.

In more detail, the housing 20 is formed of synthetic resin material and has an upright sidewall 26 together with a bottom wall 28 including a pair of sloped sections 30, 32. The housing also includes a removable top wall (not shown). As illustrated in FIG. 2, a substantially circular opening 34 is formed by the bottom wall 28 which is important for reasons to be described. The sidewall 26 has an outlet opening 36 formed therein which communicates with the assembly 24.

The housing 20 includes an inwardly extending beam-type support arm 38 which is integral with sidewall 26 and has an upstanding innermost circular segment **38*a***. The arm

Figure 4:
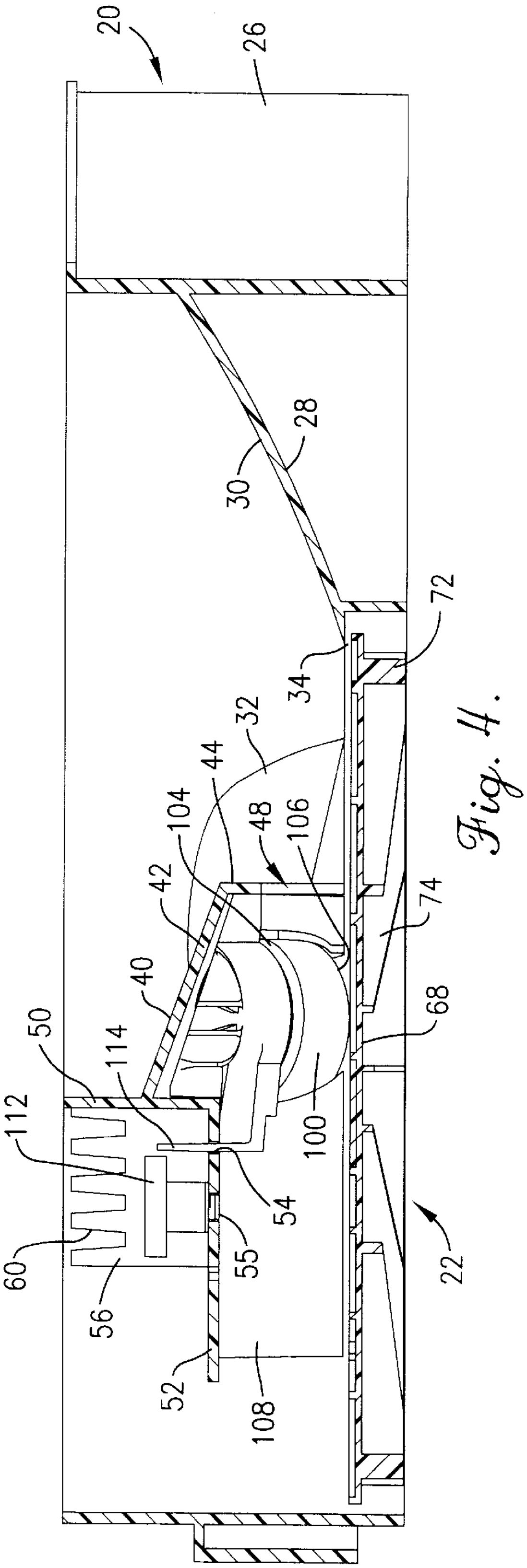
FIG. 4 is a vertical sectional view taken along line 4—4 of FIG. 2.

38 also supports a stationary extension 40 having a sloped top wall 42 as well as a depending sidewall 44. The sidewall 44 is relieved as at 46 to define a medicament entrance opening 48 (see FIG. 4). The extension 40 further includes an upright wall 50 extending from the inner end of arm 38 to the opposite side of sidewall 26, as well as a laterally extending wall 52. The wall 52 has a pair of slots 54, 55 therein with a series of positioned indicia 55*a* on the upper surface of the wall 52 adjacent the slots. The wall 52 also supports an upright, somewhat L-shaped panel 56. Referring to FIG. 2, it will be observed that a desiccant chamber 58 is bounded by the panel 56, upright wall 50, and sidewall 26. A conventional desiccant may be placed within the chamber 58 in order to prevent the accumulation of moisture in the cell 12; to this end, the panel 56 has a series of openings 60 formed therein to establish communication between the chamber 58 and the remainder of the cell 12.

Again referring to FIG. 2, it will be seen that a guide wall 62 is integral with the segment 38*a* and includes a first segment 64 extending from the arm 38 to sidewall 26, as well as a second segment 66 extending from the segment 64 and leading towards outlet opening 36.

The platen conveyor assembly 22 includes an integrally formed, synthetic resin circular platen 68 which is mounted for rotation adjacent the circular opening 34. The platen includes a series of upstanding, spaced apart ribs 70 on the upper face, as well as a peripheral drive gear 72 on its underside. A series of radial struts 74 are also formed on the underside of the platen and lead to the gear 72 (see FIG. 6). The platen 68 is rotatably mounted to the segment 38*a* by means of a screw 76 and shaft 77. Shaft 77 also supports a bushing 78 presenting a resilient outer periphery 80 having a series of circumferentially spaced projections 82 thereon. The periphery 80 may be formed of a suitable resilient material such as Kraton or Sanoprene elastomers. The shaft 77 is received within the segment 38*a*, with a washer 84 interposed between the top of the bushing 78 and the segment 38*a*.

The outlet assembly 24 is very similar to that disclosed in U.S. Pat. No. 5,897,024 and includes an outlet body 86 mounted on sidewall 26 adjacent opening 36. The body 86 supports a pivotally openable door 88 which is actuated via a lever 90. In addition, a somewhat L-shaped reinforcing wall 92 is secured to the inner face of sidewall 26 adjacent opening 36; the wall 92 has a lower opening to permit passage of medicament there through.

The housing 20 includes a medicament storage section 94 defined by the sidewall 26 and bottom wall 28. Also, a medicament passageway is defined in part by the segment 38*a*, bushing 78, and guide wall 62. The passageway 96 thus leads from the storage section 94 to the outlet opening 36.

A particular feature of the invention resides in the provision of a restricted throat section 98 forming a part of passageway 96. In particular, the throat section 98 is defined between the bushing 78 and an inclined roller 100, the latter having a conical lower section 101. In particular, the roller 100 is mounted on a stationary shaft 102 for free rotation and has an upper margin 104 and a lower margin 106. The roller is housed beneath the top wall 42 of extension 40 by a holder 108 having a cutout 110 permitting the roller to be oriented in an inclined position.

The holder 108 and thus the roller 100 is secured to the underside of wall 52 by means of a thumbscrew 112 which extends through slot 55 in wall 52 and is threaded into the upper segment of holder 108. The holder 108 further includes an upwardly projecting arm 114 which extends through slot 54 in wall 52. It will thus be appreciated that the holder 108 and roller 100 are selectively movable relative to the bushing 78 so as to adjust the size of the throat section 98.

In order to further guide the movement of medicament along the passageway 96, a pair of resilient finger elements 116 are secured to the inner surface of sidewall 26 in facing relationship to guide wall segment 64. The fingers 116 are attached via a web 118 affixed to the sidewall 26.

The operation of cell 12 proceeds as follows. When the operator of machine 10 desires to fill a given vial 120 with medicament, mechanism 14 is actuated to first retrieve the vial 120 and then position it adjacent the particular cell containing the medicament of interest. During this initial positioning, a gear 122 (FIG. 6) forming a part of the mechanism 14 comes into driving engagement with peripheral gear 72 of platen 68. In addition, the lever 90 is actuated to open door 88. Next, the gear 122 is rotated so as to correspondingly rotate platen 68. This causes the medicament within storage section 94 of housing 20 to be moved towards and through the throat section 98.

Figure 5:
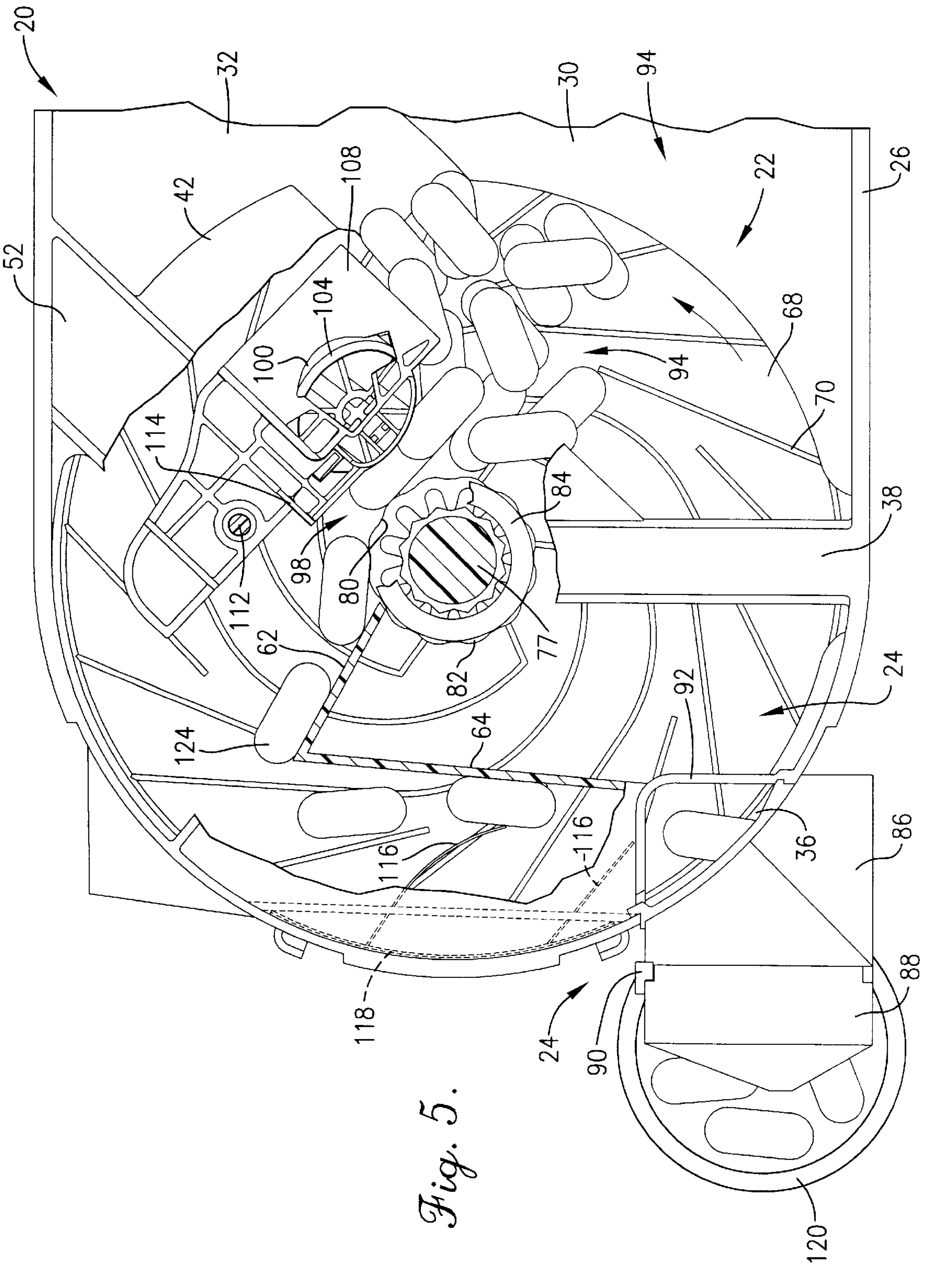
FIG. 5 is an enlarged, fragmentary view with parts broken away illustrating the medicament-dispensing operation of the cell of FIGS. 2–4.
Figure 6:
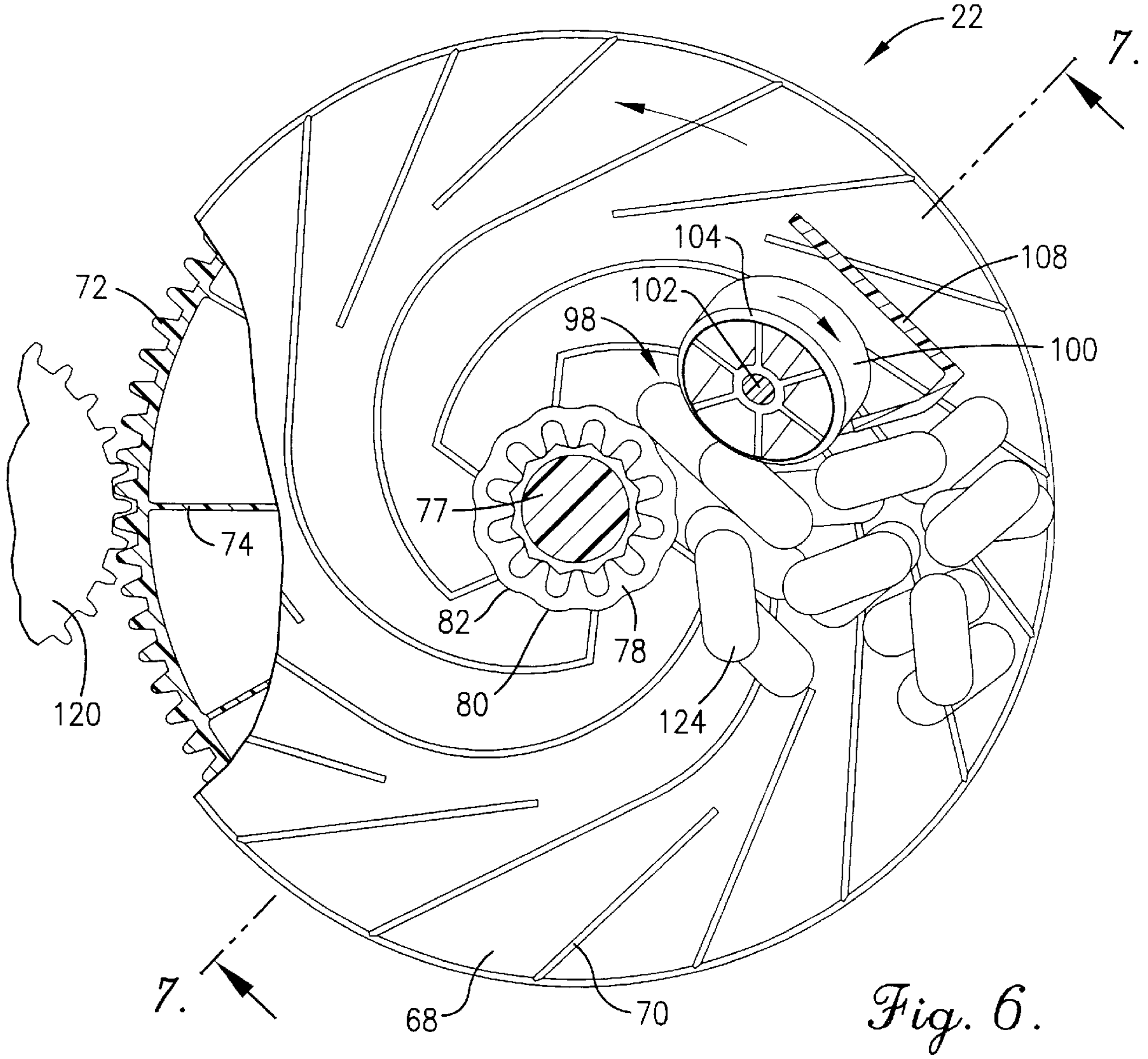
FIG. 6 is a fragmentary top view depicting the preferred plate-type conveyor assembly together with the inclined roller unit.
Figure 7:
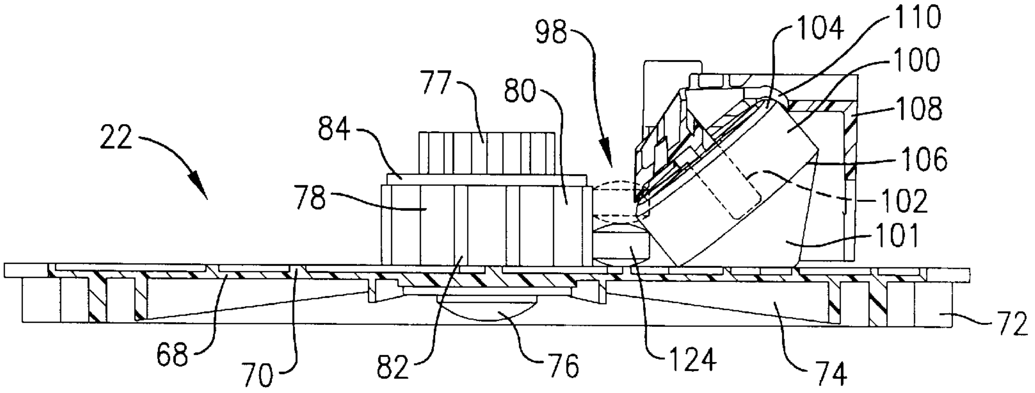
FIG. 7 is a vertical sectional view taken along line 7—7 of FIG. 6.

This action is best depicted in FIGS. 5 and 6, where it will be seen that the exemplary medicament tablets 124 proceed through the throat section 98 in a single file manner. In addition, the possibility that two such tablets 124 could pass through the throat section 98 is prevented by the positioning of roller 100 relative to bushing 78. Referring to FIG. 7, it will be seen that a tablet 124 is shown in phantom stacked atop a tablet passing normally through the throat section 98. Such passage of the stacked tablet is precluded, however, by the presence of the roller 100, i.e., the upper margin 104 of the roller is closer to the bushing 78 than is the lower margin 106 thereof, and this spacing is preselected so as to prevent simultaneous passage of two stacked tablets through the throat section. Of course, the roller 100 in each cell 12 is usually individually pre-adjusted by means of the thumbscrew 112 and guide arm 114 using the indicia 55*a* to achieve the proper spacing relative to the bushing 78.

The bushing 78 and roller 100 also cooperatively prevent medicaments from becoming lodged in the throat section 98. Particularly, because of the construction and orientation of the bushing 78 and the roller 100, the bushing 78 rotates in a counter-clockwise direction as viewed in FIGS. 5 and 6 and the roller 100 rotates in a clockwise direction. Thus, the bushing 78 and the roller 100 both act to turn medicaments lengthwise as they enter the throat section 98, thus preventing the medicaments from becoming lodged or clogged therein.

Once the tablets 124 pass through the throat section 98, they move in single file manner along wall segment 62. At this point the tablets turn the corner defined by the segments 62 and 64, under the impetus provided by the rotating platen 68. As the tablets proceed along the length of wall segment 64 they are urged into engagement with the latter by means of the fingers 116. This ensures that the tablets 124 pass through the opening in wall 92 and out the opening 36 for deposit into the vial 120. The overall machine 10 is also equipped with sensors which count the number of tablets delivered to the vial 120. In this fashion, only the desired number of tablets are dispensed into the vial. When the count is reached, the mechanism 14 releases the lever 90 to close door 88 and disengages gear 122. The vial is then capped and labeled and is directed to inspection station 18.

Dispensing cells in accordance with the invention are capable of efficiently and accurately dispensing discrete bodies while essentially eliminating jamming or breakage of the bodies and ensuring an accurate dispensing count.

I claim:

1. A dispensing cell for dispensing discrete bodies and comprising:

a housing including a storage section that holds said bodies, a dispensing outlet, and a passageway between the storage section and the outlet; and a conveyor assembly that conveys said discrete bodies from the storage section through the passageway and out said outlet, said passageway including a restricted throat section between said storage section and said outlet, said throat section defined by a pair of spaced apart components, one of said components comprising a roller presenting an upper margin and a lower margin, said roller oriented so that the upper margin thereof is closer to the other component than said lower margin thereof, so as to prevent simultaneous passage of two of said bodies through the throat section.

2. The cell of claim 1, said other components comprising a rotatable bushing forming a part of said conveyor assembly.

3. The cell of claim 2, said bushing having a resilient, body-engaging outer surface.

4. The cell of claim 1, said roller being mounted for free rotation.

5. The cell of claim 1, the position of said roller being adjustable relative to said other components so as to permit adjustment of the effective size of said throat section.

6. The cell of claim 1, said storage section including a sloped wall leading toward said throat section.

7. The cell of claim 1, including a rigid wall between said throat and said outlet, there being at least one resilient finger located to urge said discrete bodies toward the rigid wall during conveying of the rigid body between said throat section and said outlet.

8. The cell of claim 7, there being a pair of spaced apart resilient fingers.

9. The cell of claim 1, said conveyor assembly comprising a rotatable platen.

10. The cell of claim 9, said platen presenting an upper body-supporting surface, said surface having a plurality of upstanding ribs.

11. The cell of claim 1, said passageway configured for the passing and dispensing of medicament dosage forms.

* * * * *